United States Patent
Nguyen-Huu (10) Patent No.: US 9,684,784 B2
(45) Date of Patent: Jun. 20, 2017

(54) SYSTEMS AND METHODS FOR SECURELY STORING DATA

(71) Applicant: Thi Chau Nguyen-Huu, Missisauga (CA)

(72) Inventor: Thi Chau Nguyen-Huu, Missisauga (CA)

(73) Assignee: Thi Chau Nguyen-Huu, Mississauga, Ontario (CA)

( * ) Notice: Subject to any disclaimer, the term of this patent is extended or adjusted under 35 U.S.C. 154(b) by 69 days.

(21) Appl. No.: 14/700,888

(22) Filed: Apr. 30, 2015

(65) Prior Publication Data
US 2015/0379274 A1 Dec. 31, 2015

Related U.S. Application Data

(60) Provisional application No. 62/016,697, filed on Jun. 25, 2014.

(51) Int. Cl.
*G06F 21/60* (2013.01)
*G06F 21/45* (2013.01)
(Continued)

(52) U.S. Cl.
CPC .......... *G06F 21/46* (2013.01); *G06F 21/6209* (2013.01); *H04L 63/1466* (2013.01);
(Continued)

(58) Field of Classification Search
CPC .. G06F 21/6218; G06F 21/6245; G06F 21/10; H04L 63/10
See application file for complete search history.

(56) References Cited

U.S. PATENT DOCUMENTS

| | | | |
|---|---|---|---|
| 7,543,336 B2* | 6/2009 | Lampson | G06F 9/4406 705/51 |
| 8,667,280 B2* | 3/2014 | Sama | G06F 21/31 713/168 |

(Continued)

*Primary Examiner* — Yonas Bayou
(74) *Attorney, Agent, or Firm* — Bereskin & Parr LLP/S.E.N.C.R.L., s.r.l.; Ian C. McMillan (57) ABSTRACT

Various embodiments of systems and methods for securely storing data are provided. In one embodiment, a computer-readable storage module is provided for securely storing data. A storage-side processor is provided for selectively granting access to the stored data on the computer-readable storage module. A user-side memory for storing an output generation record is also provided. A user-side processor configured to provide a password receiving module for receiving a password candidate, an output generation module for using the password candidate received to attempt to access the output generation record and for generating an output based on whether the attempt to access the output generation record is successful, and an output communication module for communicating the output generated by the output generation module to the storage-side processor are also provided. The storage-side processor is configured to grant access to at least some of the data if the output received corresponds to an authorized output, the storage-side processor being configured to otherwise deny access to the data. The user-side processor is further configured to conceal whether the attempt to access the output generation record was successful until the storage-side processor receives the output generated. The output generation module is configured to generate the authorized output if the password candidate is an authorized password and the output generated is not the authorized output if the password candidate is not the authorized password.

22 Claims, 3 Drawing Sheets

(51) Int. Cl.
*G06F 21/46* (2013.01)
*H04L 29/06* (2006.01)
*G06F 21/62* (2013.01)

(52) U.S. Cl.
CPC ........... *G06F 2221/2101* (2013.01); *G06F 2221/2141* (2013.01); *H04L 63/083* (2013.01)

(56) References Cited

U.S. PATENT DOCUMENTS

| | | | |
|---|---|---|---|
| 9,553,822 B2 * | 1/2017 | Mickens | H04L 47/70 |
| 2002/0019941 A1 * | 2/2002 | Chan | G06F 21/53 |
| | | | 713/185 |
| 2004/0064739 A1 * | 4/2004 | Chung | H04L 63/12 |
| | | | 726/30 |
| 2006/0248600 A1 * | 11/2006 | O'Neill | G06F 17/30861 |
| | | | 726/29 |
| 2008/0104694 A1 * | 5/2008 | Powell | G06F 21/78 |
| | | | 726/16 |
| 2009/0025092 A1 * | 1/2009 | Smith | G06F 21/6245 |
| | | | 726/30 |
| 2009/0138944 A1 * | 5/2009 | Rajasekaran | G06F 21/62 |
| | | | 726/4 |
| 2012/0185951 A1 * | 7/2012 | Bauman | G06F 21/6245 |
| | | | 726/30 |
| 2013/0227712 A1 * | 8/2013 | Salem | G06F 21/6218 |
| | | | 726/30 |
| 2014/0068791 A1 * | 3/2014 | Resch | G06F 21/6272 |
| | | | 726/30 |
| 2014/0165215 A1 * | 6/2014 | Kurkure | G06F 21/10 |
| | | | 726/30 |

* cited by examiner

SYSTEMS AND METHODS FOR SECURELY STORING DATA

RELATED APPLICATIONS

This application claims priority from provisional U.S. patent application No. 62/016,697, filed Jun. 25, 2014, entitled "SYSTEMS AND METHODS FOR SECURELY STORING DATA", the disclosure of which is incorporated herein, in its entirety, by reference.

FIELD

The described embodiments relate to systems and methods for securely storing data and controlling access to data.

BACKGROUND

In many situations, individuals and corporations need to securely store electronic data. A key file, storing encryption or license keys, is an example of the type of data that individuals and corporations often need to store securely. Other examples of data that may need to be stored securely include sensitive information such as business and trade secrets, confidential and personal information and in general any information that an individual or corporation desires to keep private. In some cases, data can be stored on secure storage devices that use access passwords to control access to the data.

The security of data stored on a device can be compromised when its access password is systematically and exhaustively attempted until the correct one is identified. In some cases, this type of password-checking exercise may take the form of a dictionary attack, where all the words in a pre-arranged list of values expected to have higher chances of success are attempted, or a brute force attack where a large proportion of the password syntax is searched systematically. Such password-checking exercises can be automated and rendered relatively trivial through the use of computer software particularly when they can be implemented offline.

SUMMARY

In a first aspect, some embodiments provide a system for controlling access to data. The system comprises a computer-readable storage module for securely storing the data; a storage-side processor for selectively granting access to the stored data on the computer-readable storage module; a user-side memory for storing an output generation record; and a user-side processor configured to provide a password receiving module for receiving a password candidate, an output generation module for using the password candidate received to attempt to access the output generation record and for generating an output based on whether the attempt to access the output generation record is successful, and an output communication module for communicating the output generated by the output generation module to the storage-side processor. The storage-side processor is configured to grant access to at least some of the data if the output received corresponds to an authorized output, the storage-side processor being configured to otherwise deny access to the data. The user-side processor is further configured to conceal whether the attempt to access the output generation record was successful until the storage-side processor receives the output generated. The output generation module is configured to generate the authorized output if the password candidate is an authorized password and the output generated by the output generation module is not the authorized output if the password candidate is not the authorized password.

In accordance with another aspect of some embodiments, there is provided a method for controlling access to data. The method comprises securely storing the data on a computer-readable storage module; securely storing an output generation record on a user-side memory; receiving, at a user-side processor, a password candidate; if and only if the password candidate is an authorized password, accessing the output generation record; generating an output based on whether the attempt to access the output generation record is successful; operating the user-side processor to conceal whether the attempt to access the output generation record was successful until the storage-side processor receives the output generated; communicating the output to a storage-side processor; determining, by the storage-side processor, if the communicated output corresponds to an authorized output; and granting access to at least some of the data stored on the computer-readable storage module if the communicated output corresponds to an authorized output and denying access otherwise. The generated output is the authorized output if the password candidate is an authorized password; and the generated output is not the authorized output if the password candidate is not the authorized password.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

DETAILED DESCRIPTION OF EXEMPLARY EMBODIMENTS

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices, in known fashion.

Each program may be implemented in a high level procedural or object oriented programming or scripting language, or both, to communicate with a computer system. Alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or RAM, where the data stored thereon is only temporarily stored. The computer usable instructions may also be in various forms, including compiled and non-compiled code.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, this description and the drawings are not to be considered as limiting the scope of the embodiments described herein in any way, but rather as merely describing the implementation of the various embodiments described herein.

The described embodiments are methods, systems and apparatus that generally relate to a system and method for securely storing data and controlling access to the data. In some cases, the data may be a data file storing encryption or license keys and may be referred to as a keyfile. In other cases, the data can be any type of data or information that can be stored on a computer-readable storage module that a user wishes to store securely. For example a PKCS #12 file could be stored on the computer-readable storage module, bundling many cryptographic objects in a single file.

Generally herein, the term "user" is used to refer to an individual or a group of individuals authorized to access at least some of the data stored on a computer-readable storage module. For example, a user could be an employee of a corporation who is authorized to access confidential information stored on the computer-readable storage module for that corporation.

A user is provided with a corresponding authorized password. The authorized password can be used to access the data stored on the computer-readable storage module. However, the authorized password cannot be provided directly to the storage-side device to access the data. The user must first input their authorized password to an access device, or user-side device. The user-side device generates an output based on the received input that can then be provided to the storage-side device. Each input to the access device or user-side device may be referred to as a password candidate.

The user-side device can be configured to generate an output for every password candidate it receives. Each generated output can then be communicated to the storage-side device. The storage-side device can determine whether to grant access to the data based on the output received. If the output received corresponds to an authorized output for a user, then the storage-side device can provide access to a portion of the data stored for that user. The storage-side device is configured to otherwise deny access to the data.

The user-side device memory can be configured to store an output generation record, which may contain the authorized output that corresponds to an authorized password. The output generation record is securely stored in the memory of the user-side device in an encrypted or scrambled form using an encryption scheme known to those skilled in the art. In some cases, the output generation record may be accessed or decrypted using the authorized password, supplied by the user, as the decryption key. The user-side device is configured to generate an authorized output if the password candidate received corresponds to an authorized password. The user-side device is configured to generate an output that is not the authorized output if the password candidate received does not correspond to the authorized password. The user-side device is configured such that each output generated by the user-side device conforms to an output syntax. That is, regardless of whether the password candidate is an authorized password or not, the output generated will conform to the same output syntax.

As used herein, the term "attacker" refers to any individual or group of individuals, other than an authorized user, who may attempt to access the data stored on the computer-readable storage module. Often an attacker will attempt to access the data without knowledge of the authorized password. An attacker can use various methods to attempt to access the data, such as a dictionary attack or a brute-force attack, where password candidates can be attempted systematically. Various aspects of the systems and methods described herein can be used to mitigate the risk of an attacker being able to successfully access the data.

Often, a dictionary attack is used to predict a password that is used to control access to data. Users typically choose a password that has a short bit length because it is easier to remember. One approach to mitigate the risks of dictionary attacks is to have a minimum bit length requirement for passwords. However, in these cases users will typically still select a password having the minimum bit length because it is easier to remember. Of course, there is no reason in principle why much longer passwords could not be used. For example, the password might in some instances have the same bit length as the output generated.

In the systems and methods described herein, access to the data cannot be granted by directly entering a password candidate into the device that stores the data. The password candidates must first be entered into the user-side device and the output generated by that user-side device must be communicated to the storage-side device to access the data. Therefore, only the storage-side device is capable of validating whether the received output is the authorized output, making an offline attack on the user-side device impractical.

An attacker in an offline attack may have direct access and/or possession of the user-side device, and may attempt to access the output generation record stored in the memory of the user-side device by supplying various password candidates through a brute force or a dictionary attack. As mentioned above, the user-side device is configured to generate an output conforming to the output syntax for every password candidate it receives, including that of the authorized password, such that an authorized output is indistinguishable from other outputs. Therefore, unless the attacker already knows the authorized output, the output generated would be so configured that the output provided in response to the correct password, the authorized output, is not determinable from a plurality of outputs provided in response to a plurality of attempts to guess the correct password. For example, say that an attacker provides a plurality of password candidates to the user-side processor in an attempt to guess the correct password. Further assume that the attacker actually manages to guess the correct password, in that one of the password candidates is the authorized password. Then, in at least some embodiments, a plurality of outputs will be provided by the user-side processor in response to the plurality of password candidates provided, and these outputs will be so configured relative to one another that, without previously knowing the authorized output, the authorized output provided in response to the authorized password will not be determinable from the plurality of outputs. In some embodiments, the user-side device may be configured to produce the same output for the same password candidate regardless of the time the password was submitted. Thus, an attacker would not be able to infer that password is incorrect because the user-side device yielded different outputs at different times. Consequently configuring the user-side device in such a manner can conceal whether access to the output generation record was successful from the attacker in an offline attack. The attacker must therefore provide the output to the storage-side device before the attacker can determine if an attempted password candidate was an authorized password.

The separation of the user-side device and the storage-side device can be used to frustrate attackers by, for example, forcing password-checking exercises to be conducted online. These online password-checking exercises are often more difficult to implement as, in some cases, additional access attempts can be locked out for some period of time after a certain number of incorrect access attempts have occurred.

In some cases, an attacker may attempt to attack the storage-side device directly. However, the output syntax and the system in general can be configured so as to render such an attack impractical. For example, the output syntax can define a total number of output syntax candidates much greater than the number of password candidates that an attacker could attempt to try. Furthermore, the storage-side device can also be configured to lock out or delay further attempts at accessing the data, at least for a limited period of time, if the output received is incorrect.

In these cases, dictionary and brute-force attacks will be very time-consuming and this can deter attackers and potential attackers. In order to systematically attempt to access the storage-side device the attacker may be forced to attempt a larger total number of output candidates than would be necessary with a typical access password that a user has chosen and must remember. The time required for an attack can be further extended if the attacker must wait a delay period of time every time the storage-side device has received a threshold number of outputs that are not the authorized output.

Figure 1:
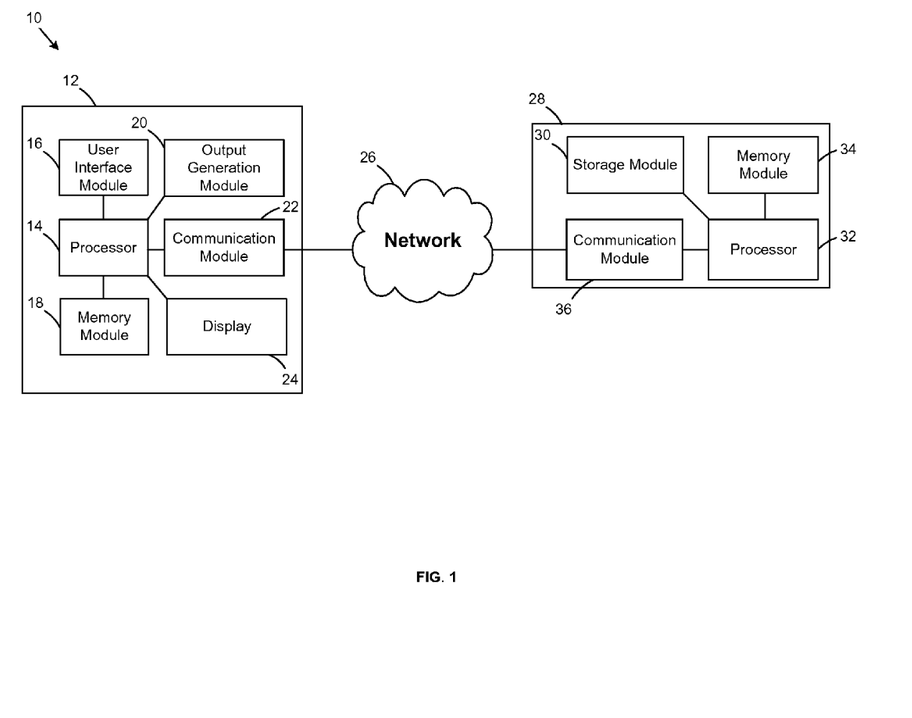
FIG. 1 is a block diagram illustrating an example system for controlling access to data in accordance with an embodiment.

Referring now to FIG. 1, shown therein is an example embodiment of a system 10 for controlling access to data. The system 10 includes a user-side module 12, a network 26, and a storage side module 28.

The user-side module 12 includes a user-side processor 14, a user interface module 16, a memory module 18, an output generation module 20, a, output communication module 22 and a display 24. Many components of the user-side module 12 can be implemented using a desktop computer, a laptop, a mobile device, a tablet, and the like. The user-side module 12 is an example of a user-side device into which a user provides a password candidate and an output is generated based on that password candidate.

The user-side processor 14 controls the operation of the user-side module 12 and can be any suitable processor, controller or digital signal processor that can provide sufficient processing power depending on the configuration, purposes and requirements of the system 10 as is known by those skilled in the art. For example, the user-side processor 14 may be a high performance general processor. In alternative embodiments, the user-side processor 14 may include more than one processor with each processor being configured to perform different dedicated tasks. In alternative embodiments, specialized hardware can be used to provide some of the functions provided by the user-side processor 14.

The user interface module 16 can include at least one of a mouse, a keyboard, a touch screen, a thumbwheel, a track-pad, a track-ball, a card-reader, voice recognition software, iris recognition hardware and software, fingerprint recognition hardware and software and the like again depending on the particular implementation of the user-side module 12. In some cases, some of these components can be integrated with one another. The user interface module 16 may also include at least one of a microphone, a speaker and a printer, for example. The user interface module 16 can support various and different authentication inputs that allow users to input a password candidate in the form of an alphanumeric access code, a biometric scan (e.g. fingerprint or iris), using a smartcard, or using tokens, for example, alone or in conjunction with a trusted platform module (TPM) for additional security.

The memory module 18 can include RAM, ROM, one or more hard drives, one or more flash drives or some other suitable data storage elements such as disk drives, etc. The memory module 18 may be used to store an output generation record, possibly comprising an encrypted or scrambled authorized output, an operating system and programs as is commonly known by those skilled in the art. For instance, the operating system provides various basic operational processes for the user-side module 12.

The programs include various user programs so that a user can interact with the user-side module 12 to perform various functions such as, but not limited to, inputting password candidates through the user-interface module 16. For example, the user-side processor 14 can be configured to provide a password receiving module for receiving a password candidate inputted from a user. The password receiving module can be configured to receive and interpret the various forms of password candidates received through the user interface module 16.

The user-side processor 14 can be configured to provide an output generation module 20. The output generation module 20 is typically implemented using software, but there may be instances in which it is implemented using (field-programmable gate array) FPGA or application specific circuitry. In some embodiments, the output generation module 20 may be configured to generate an output based on whether it can successfully access the output generation record. That is, the output generation module may always generate an output, conforming to a predefined syntax, regardless of whether the output generation record is accessed; however, the specific output provided may depend on whether the output generation record is successfully accessed, as the authorized output may only be generated if the output generation record is successfully accessed. The output generation module 20 can further be configured to generate an output conforming to an output syntax based on a password candidate received by the user-side module 12. Each generated output can conform to the output syntax, regardless of the password candidate received by the user-side module 12.

The user-side processor 14 can also be configured to provide an output communication module 22. The output communication module 22 can be any interface that allows the user-side module 12 to communicate with other devices or computers such as the storage-side module 28. The output communication module 22 can be configured to communicate the output generated by the output generation module 20 to the storage-side processor 32.

In some cases, the output communication module 22 can include at least one of a serial port, a parallel port or a USB port that provides USB connectivity. The output communication module 22 can also include at least one of an Internet, Local Area Network (LAN), Ethernet, Firewire, SATA, modem or digital subscriber line connection. Various combinations of these elements can be incorporated within the output communication module 22. In some cases, the output communication module 22 can also include a wireless unit that can be used by the user-side module 12 to communicate with other devices or computers. The wireless unit can be a radio that communicates utilizing CDMA, GSM, GPRS or Bluetooth protocol according to standards such as IEEE 802.11a, 802.11b, 802.11g, or 802.11n.

The display 24 can be any suitable display that provides visual information depending on the configuration of the user-side module 12. For instance, the display 24 can be a cathode ray tube, a flat-screen monitor and the like if the user-side module 12 is a desktop computer. In other cases, the display 24 can be a display suitable for a laptop, tablet or handheld device such as an LCD-based display and the like.

The network 26 can be a communication network such as a wired or wireless connection to the internet and/or other types of computer or telecommunication networks. Those skilled in the art may also appreciate that network 26 may take the form of locally interconnected devices communicating over communications protocols such as SATA, Firewire and USB. The user-side module 12 and the storage-side module 28 are operable to communicate using the network 26 using the above mentioned protocols and/or interfaces. In some cases, the user-side module 12 and the storage-side module 28 can also communicate using a secure or encrypted connection such as by using HTTPS through a SSL/TSL tunnel.

The storage side module 28 includes a computer-readable storage module 30, a storage-side processor 32, a storage-side memory module 34 and a storage-side communication module 36. The storage-side module 28 is an example of a storage-side device for securely storing data and controlling access to the data based on outputs received from the user-side module 12.

In some cases, the storage-side module 28 can be a hardware device for securely storing data remotely from the user-side module 12. Having a remote storage-side module 28 can force a user or attacker to interact with the storage-side module 28 in an online manner in order to access the data stored thereon. A remote storage-side module 28 can also allow distributed users to access the same data, or same portions of data. In some cases, for example, the storage-side module 28 can be a server that stores data that can be accessed remotely by one or more users.

The storage-side processor 32 controls the operation of the storage-side module 28 and can be any suitable processor, controller or digital signal processor that can provide sufficient processing power such as those described herein with reference to the user-side processor module 14. The storage-side memory module 34 and the storage-side communication module 36 can also be hardware modules or software modules substantially similar to the user-side memory module 16 and the output communication module 22 respectively, described herein.

The computer-readable storage module 30 can include RAM, ROM, one or more hard drives, one or more flash drives, solid state drives or some other suitable data storage elements such as disk drives, etc. The data storage elements of the computer-readable storage module 30 can store data in an encrypted manner to prevent unauthorized access to the data.

The storage-side processor 32 is configured to selectively grant access to the data stored on the computer-readable storage module 30. The storage-side processor 32 can receive the outputs communicated by the output communication module 22, for example, using the storage-side communication module 36. The storage-side processor 32 is configured to grant access to at least some of the data stored if the output received corresponds to an authorized output. The storage-side processor 32 is configured to otherwise deny access to the data.

In some cases, the computer-readable storage module 30 may store portions of data for a plurality of users, where each portion of the data corresponds to one user in the plurality of users. Each user may have a corresponding authorized output. The storage-side processor 32 can be configured to grant access to the portion of the data stored for a user if the output received corresponds to the corresponding authorized output for that user.

In some cases, the user-side module 12 can be configured to support multiple users. Each user may have a corresponding authorized password, and the user-side module 12 can be configured to generate a corresponding authorized output when the authorized password is received for that user.

In some cases, the system 10 may be configured so that a plurality of authorized users can access the same data or the same portions of data stored on the computer-readable storage module 30. For example, in some cases at least one additional user-side module may be provided in system 10. Each additional user-side module can be configured in substantially the same manner as the user-side module 12.

In some cases, the storage-side module 28 may only provide support for a limited number of users and/or a limited number of authentication types. Using multiple additional user-side modules along with the storage side module 28 may allow the system 10 to support numerous and distributed users who need to access the data stored on the storage-side module 28.

That is, each additional user-side processor can be configured to provide an additional password receiving module for receiving an additional password candidate; an additional output storage record for storing an additional authorized output; an additional output generation module for generating an additional output that conforms to the output syntax based on the additional password candidate received; and an additional output communication module for communicating the additional output generated by the additional output generation module to the storage-side processor.

Each additional output generation module can be configured to generate an authorized output that provides access to the same portion of data, if the additional password candidate received is an authorized additional password. In some cases, each of the additional output generation modules can be configured to generate the same authorized output. Each additional output generation module can also be configured to generate an additional output that is not the authorized output if the additional password candidate received is not the additional authorized password.

In some cases, the authorized additional password for each of the additional user-side modules may be different. For example, each additional user-side module may have a different authorized password corresponding to a user associated with that user-side module. In some cases, various additional user-side modules may accept password candidates having different forms. For example, the authorized password for one of the additional user-side modules may be an alphanumeric password, while the authorized password for a second one of the additional user-side module may be a biometric password.

In some cases, the user-side module 12 (and the additional user-side modules, if any) can be synchronized with the storage-side module 28, for example using a clock or other synchronization method. The output generated by the user-side module 12 and the additional user-side modules can be dependent on the clock. The storage-side module 28 can then determine if the output received is the corresponding output based on the time of receipt, so long as the output is communicated to the storage-side module within a threshold period of time.

Various aspects of the system 10 can make it difficult, if not impossible, for an attacker to perform offline password-checking exercises. An example of an offline password-checking exercise occurs when an attacker has enough information to test passwords without interacting with the system securely storing the data. This can occur, for example, if the attacker obtains a copy of the hash of a password. However, in the system 10, even if the attacker is able to determine the generated outputs that correspond to various password candidates, they attacker is still unable to determine whether those generated outputs are authorized outputs without interacting with the storage-side module 28.

For ease of understanding, certain aspects of the processes described herein are described as being performed by the various modules of the system 10. It should be noted, however that these processes are not limited in that respect, and the various aspects of the processes described herein may be performed by other modules for controlling access to data.

Figure 2:
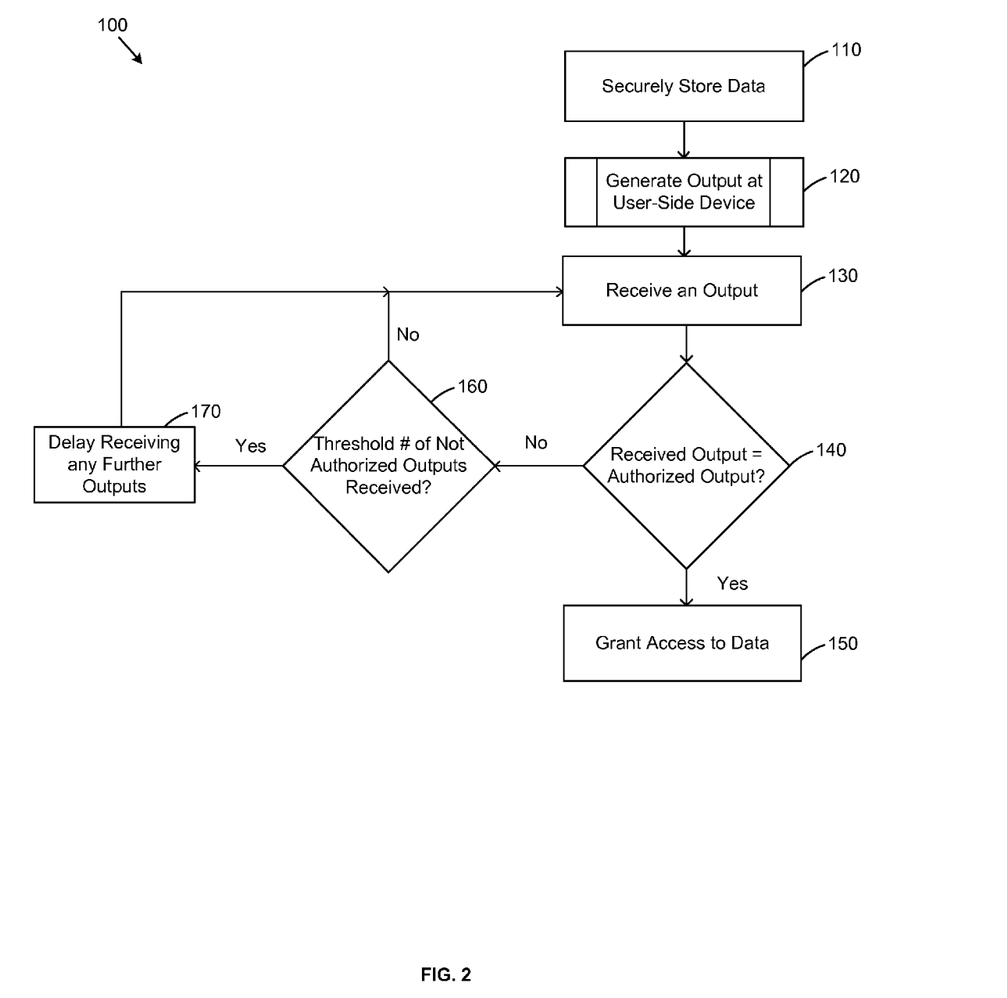
FIG. 2 is a flowchart illustrating an example process for controlling access to data in accordance with an embodiment.

Referring now to FIG. 2, shown therein is an example embodiment of a process 100 for controlling access to data that can be implemented by the storage-side processor 32. At 110, data is securely stored on the computer-readable storage module 30. The data can be stored using various encryption methods to prevent unauthorized access to the data.

Figure 3:
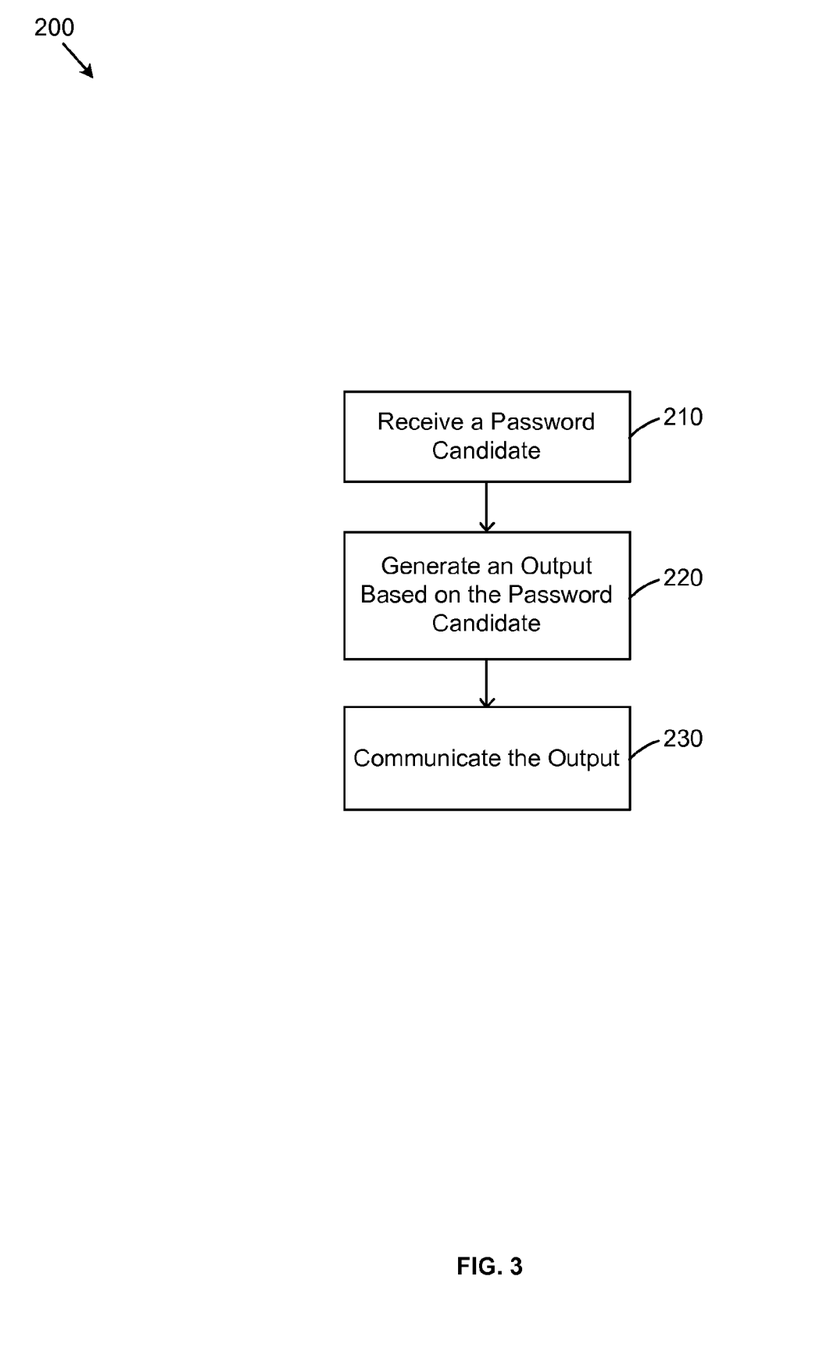
FIG. 3 is a flowchart illustrating an example sub-process that can be used with the process for controlling access to data shown in FIG. 2.

At 120, an output is generated at a user-side device such as the user-side module 12. Referring now to FIG. 3, shown therein is an example embodiment of a sub-process 200 for generating an output at a user-side device.

In some cases, at least one additional user-side device can also be provided. The at least one additional user-side device can also include an additional user-side processor that is configured to provide an additional password receiving module, an additional output generation module, an additional output generation record and an additional output communication module. Each additional user-side device can be configured to perform sub-process 200.

The user-side processor 14 can be configured to provide a password receiving module operable to receive a password candidate. At 210, the password receiving module receives a password candidate. The password candidate may be inputted by a user into the user-side module 12 using the user interface module 16. The password receiving module can further be operable to receive a plurality of password candidates over a plurality of cycles.

The password candidate can have various forms. For example, the password candidate can be an alphanumeric password inputted into the user interface module using a user interface device such as a keyboard or a touch screen. In other cases, the password candidate could include various biometric authentication methods, as well as smartcard and token based authentication methods.

At 220, the output generation module 20 can generate an output based whether the supplied candidate password is the authorized password so as to enable access to the authorized output stored in the output generation record. The output generated by the output generation module 20 can conform to an output syntax common among all password candidates. The output generation module 20 is configured to generate an authorized output if the password candidate is an authorized password. The output generation module 20 is further configured to generate an output that is not the authorized output is the password candidate is not the authorized password.

As discussed previously, authorized outputs generated by the output generation module 20 cannot be distinguished from other outputs until the outputs are provided to the storage-side processor, as every generated output conforms to the output syntax. As a result, an attacker cannot determine from the output generated by the user-side module 12 whether they have entered an authorized password.

When the password receiving module is operable to receive a plurality of password candidates over a plurality of cycles, the output generation module 20 can generate a plurality of outputs based on the plurality of password candidates received. Each cycle in the plurality of cycles may correspond to a distinct attempt by a user or by an attacker to access the data stored in the storage-side processor.

In some cases, the authorized password can be defined such that the authorized password has a password minimum bit length n, where n is an integer greater than 4. In some cases, n can be a larger integer such as 8 or 16 bits for example. The password minimum bit length n can be selected based on the level of security a user of the system 10 desires. While a longer password minimum bit length n can increase the entropy of potential password candidates, often users will select an authorized password having the password minimum bit length n as it is easier to remember.

In some cases, the output syntax can define a total number of output syntax candidates conforming to the output syntax. The output syntax can be defined such that the total number of output syntax candidates is sufficiently larger than the total number of potential password candidates that could have the password minimum bit length n. In some cases, the total number of output syntax candidates is larger than or equal to $2^n$. In some cases, the total number of output syntax candidates is larger than or equal to $2^{2n}$.

The greater the number of output syntax candidates, the more difficult it will be for an attacker to correctly identify an authorized output in a dictionary or brute-force attack. In some cases, a user or administrator of the system 10 can define the output syntax so as to increase the number of output syntax candidates. For example, the output syntax may be defined so as to include output syntax candidates having up to 256 bits (32 bytes) or 512 bits (64 bytes). The output syntax can be defined to include output syntax candidates having an output bit length much larger than a bit length of the authorized passwords likely to be selected by a user.

The output syntax can define the total number of output syntax candidates so that the total number of outputs that could conform to the syntax is much greater than the number of potential password candidates that could be used with the password minimum bit length n.

In some cases, the bit length of the authorized output is variable between an output minimum bit length and an output maximum bit length. Having an output syntax that allows output syntax candidates to have a variable bit length can increase the total number of output syntax candidates that conform to the output syntax, in particular where there is an output maximum bit length.

The generation of an output conforming to the output syntax for each password candidate received may ensure that a potential attacker cannot determine whether the password candidate is an authorized password based on the generated output alone. The output from the user-side module 12 must be provided to the storage-side module 28 before the attacker is able to determine if they have guessed the correct password candidate.

At 230, the output communication module 22 communicates the output to the storage-side processor 32. Referring again to FIG. 2, at 130 the storage-side processor 32 receives the output communicated from the output communication module 22.

In some cases, the user-side module 12 and the storage-side module 28 can be synchronized to a clock. A random token can be generated based on the clock and used by the output generation module 20 to generate a randomized output corresponding to the received password candidate. This randomized output can be communicated to the storage-side processor 32 within a predetermined period of time such that the storage-side processor is able to decrypt the generated output.

In cases where a variable bit length output is used, the authorized output could vary from the output minimum bit length and the output maximum bit length based on randomization factors that could be related to the clock, for example.

At 140, the storage-side processor 32 determines whether the received output corresponds to an authorized output. In some cases, there can be more than one authorized output. For example, where the computer-readable storage module 30 stores a plurality of data portions corresponding to a plurality of users, each of the users may have a different authorized output.

If the storage-side processor 32 determines that the received output is an authorized output, then it will grant access to at least some of the data at 150. In the example where a plurality of data portions are stored on the computer-readable storage module 30, the storage-side processor 32 can be configured to grant access to the portion of the data corresponding to the user whose authorized output has been received. The storage-side processor 32 is configured to deny access to the data if the received output is not an authorized output. In some cases, process 100 may end if the storage-side processor 32 has determined that the received output is not an authorized output.

In some cases, the user-side processor 14 can be configured to repeat the sub-process 200 over a plurality of cycles. Over the plurality of cycles, the password receiving module is operable to receive a plurality of password candidates. The output generation module is operable to generate a plurality of outputs based on the plurality of password candidates received. The output communication module 22 is operable to communicate the plurality of outputs generated by the output generation module to the storage-side processor 32.

In some cases, after the storage-side processor 14 has determined that a received output is not an authorized output at 140, the process 100 will proceed to 160 where the storage-side processor 14 is configured to determine if a threshold number of outputs have been received that are not authorized outputs.

If the threshold number of outputs other than authorized outputs has not been received, then the storage-side processor 14 can return to 130 and receive further outputs. If the threshold number of outputs than authorized outputs has been received, then the storage-side processor 32 is operable to delay receiving any further outputs for at least a delay period of time.

The delay period of time can further frustrate an online cryptographic attack. As the user-side processor 14 is operable to generate an output for each of the received password candidates, whether the password candidate is authorized or not, an attacker must provide the outputs to the storage-side processor 32 to determine is an authorized password has been inputted. The additional delay period of time after the threshold number of outputs than authorized outputs have been received can further frustrate attempts by attackers to access the data stored on the computer-readable storage module 30.

The present invention has been described here by way of example only. Various modification and variations may be made to these exemplary embodiments without departing from the spirit and scope of the invention, which is limited only by the appended claim.

I claim:

1. A system for controlling access to data, the system comprising:
    a computer-readable memory for securely storing the data;
    a storage-side processor for selectively granting access to the stored data on the computer-readable memory;
    a user-side memory for storing an output generation record;
    a user-side processor, in operation, the user-side processor:
        receiving a password candidate,
        attempting to access the output generation record using the password candidate received,
        generating an output based on whether the attempt to access the output generation record is successful, and
        communicating the output generated to the storage-side processor;
    wherein
    the storage-side processor, in operation, grants access to at least some of the data if the output received corresponds to an authorized output, the storage-side processor, in operation, otherwise denying access to the data;
    the user-side processor, in operation, conceals whether the attempt to access the output generation record was successful until the storage-side processor receives the output generated;

the user-side processor, in operation, generates the output to be the authorized output if the password candidate is an authorized password; and the output generated by the user-side processor is not the authorized output if the password candidate is not the authorized password.

2. The system as defined in claim 1 wherein the user-side processor, in operation, conceals whether the attempt to access the output generation record was successful until the storage-side processor receives the output generated by controlling the output generated to conform to an output syntax regardless of whether the attempt to access the output generation record is successful.

3. The system as defined in claim 2 wherein the output generation record comprises the authorized output stored in encrypted or scrambled form, the user-side processor being further operable to decrypt or unscramble the authorized output stored in the output generation record using the authorized password.

4. The system as defined in claim 1 wherein, over a plurality of cycles, each cycle corresponding to a distinct attempt to access the at least some of the data stored in the storage-side processor, the user-side processor is operable to receive a plurality of password candidates, the user-side processor is operable to generate a plurality of outputs based on the plurality of password candidates received, and the user-side processor is operable to communicate the plurality of outputs generated to the storage-side processor.

5. The system as defined in claim 1 wherein the authorized password is defined such that the authorized password has a password minimum bit length n, n being an integer greater than 4.

6. The system as defined in claim 5 wherein the output syntax defines a total number of output syntax candidates conforming to the output syntax, the total number of output syntax candidates being larger than or equal to $2^n$.

7. The system as defined in claim 5 wherein the output syntax defines a total number of output syntax candidates conforming to the output syntax, the total number of output syntax candidates being larger than or equal to $2^{2n}$.

8. The system as defined in claim 5 wherein a bit length of the authorized output is variable between an output minimum bit length and an output maximum bit length.

9. The system as defined in claim 1 further comprising a plurality of corresponding authorized passwords including the authorized password and a plurality of corresponding authorized outputs including the authorized output, wherein
each user in a plurality of users has a corresponding authorized password in the plurality of corresponding authorized passwords, the user-side processor, in operation, generating a corresponding authorized output in the plurality of corresponding authorized outputs based on the corresponding authorized password; and
the storage-side processor, in operation, granting access to a portion of the data stored for a user if the output received corresponds to a corresponding authorized output for that user.

10. The system as defined in claim 1 wherein after receiving a threshold number of outputs other than authorized outputs, the storage-side processor is operable to delay receiving any further outputs for at least a delay period of time.

11. The system as defined in claim 1 further comprising:
at least one additional user-side memory, each additional user-side memory for storing an additional output generation record;
at least one additional user-side processor, each additional user-side processor, in operation:
receiving an additional password candidate,
attempting to access the additional output generation record using the additional password candidate received,
generating an additional output based on whether the attempt to access the additional output generation record is successful, and
communicating the additional generated output to the storage-side processor;
wherein
the each additional user-side processor, in operation, conceals whether the attempt to access the additional output generation record was successful until the storage-side processor receives the additional output generated;
the each additional user side processor, in operation, generates the authorized output if the additional password candidate is an authorized additional password;
the additional output generated by the each additional user-side processor is not the authorized output if the additional password candidate is not the authorized additional password; and
the authorized additional password is not the same as the authorized password.

12. A method for controlling access to data, the method comprising
securely storing the data on a computer-readable storage module;
securely storing an output generation record on a user-side memory;
receiving, at a user-side processor, a password candidate;
if and only if the password candidate is an authorized password, accessing the output generation record;
generating an output based on whether the attempt to access the output generation record is successful;
operating the user-side processor to conceal whether the attempt to access the output generation record was successful until the storage-side processor receives the output generated;
communicating the output to a storage-side processor;
determining, by the storage-side processor, if the communicated output corresponds to an authorized output; and
granting access to at least some of the data stored on the computer-readable storage module if the communicated output corresponds to an authorized output and denying access otherwise;
wherein
the generated output is the authorized output if the password candidate is the authorized password; and
the generated output is not the authorized output if the password candidate is not the authorized password.

13. The method as defined in claim 12, wherein operating the user-side processor to conceal whether the attempt to access the output generation record was successful until the storage-side processor receives the output generated comprises controlling the output generated to conform to an output syntax regardless of whether the attempt to access the output generation record is successful.

14. The method of 13, further comprises operating the user-side processor to decrypt or unscramble, using the authorized password, the authorized output stored in the output generation record in encrypted or scrambled form.

15. The method as defined in claim 12, further comprising:

receiving a plurality of password candidates at the user-side processor;

generating, by the user-side module, a plurality of outputs based on the plurality of password candidates received; and communicating the plurality of outputs to the storage-side processor.

16. The method as defined in claim 12, wherein the authorized password has a password minimum bit length n, n being an integer greater than 4.

17. The method as defined in claim 16, wherein the output syntax defines a total number of output syntax candidates conforming to the output syntax, the total number of output syntax candidates being larger than or equal to $2^n$.

18. The method as defined in claim 16, wherein the output syntax defines a total number of output syntax candidates conforming to the output syntax, the total number of output syntax candidates being larger than or equal to $2^{2n}$.

19. The method as defined in claim 16, wherein a bit length of the authorized output is variable between an output minimum bit length and an output maximum bit length.

20. The method as defined in claim 12, wherein each user in a plurality of users has a corresponding authorized password that is one of a plurality of corresponding authorized passwords, the plurality of corresponding authorized passwords including the authorized password and the method further comprises:

generating, by the user-side processor, a corresponding authorized output based on the corresponding authorized password, wherein the corresponding authorized output is one of a plurality of corresponding authorized outputs, the plurality of corresponding authorized outputs including the authorized output; and granting access to a portion of the data stored for a user if the communicated output corresponds to the corresponding authorized output for that user.

21. The method as defined in claim 12, further comprising receiving, by the storage-side processor, a threshold number of outputs other than authorized outputs; and delaying, by the storage-side processor, receiving any further outputs for at least a delay period of time after receiving the threshold number of outputs other than authorized outputs.

22. The method as defined in claim 12, further comprising securely storing an additional output generation record on an additional user-side memory;

receiving, at an additional user-side processor, an additional password candidate;

generating an additional output based on whether an attempt to access the additional output generation record is successful; and communicating the additional output to the storage-side processor;

wherein the additional output generated is the authorized output if the additional password candidate is an authorized additional password;

the additional output generated is not the authorized output if the additional password candidate is the authorized additional password; and the authorized additional password is not the same as the authorized password.

* * * * *